(12) United States Patent
Bacon

(10) Patent No.: US 9,835,188 B2
(45) Date of Patent: Dec. 5, 2017

(54) UNIVERSAL WEDGE CLAMP

(71) Applicant: Titan Formwork Systems LLC, Tempe, AZ (US)

(72) Inventor: David L. Bacon, Tempe, AZ (US)

(73) Assignee: Titan Formwork Systems LLC, Tempe, AZ (US)

( * ) Notice: Subject to any disclaimer, the term of this patent is extended or adjusted under 35 U.S.C. 154(b) by 329 days.

(21) Appl. No.: 14/204,897

(22) Filed: Mar. 11, 2014

(65) Prior Publication Data

US 2014/0270920 A1   Sep. 18, 2014

Related U.S. Application Data

(60) Provisional application No. 61/781,412, filed on Mar. 14, 2013.

(51) Int. Cl.
  *F16B 2/14*   (2006.01)
  *E04G 11/48*   (2006.01)
  *E04G 25/06*   (2006.01)
  *F16B 7/04*   (2006.01)
  (Continued)

(52) U.S. Cl.
  CPC ............ *F16B 2/14* (2013.01); *E04G 11/48* (2013.01); *E04G 25/061* (2013.01); *E04G 25/065* (2013.01); *E04G 5/16* (2013.01); *E04G 7/26* (2013.01); *F16B 7/0493* (2013.01); *Y10T 403/4631* (2015.01)

(58) Field of Classification Search
  CPC ........ F16B 2/14; F16B 7/0493; E04G 25/061; E04G 25/065; E04G 11/48; E04G 7/26; E04G 5/16; Y10T 403/4631

USPC ......................................................... 403/400
See application file for complete search history.

(56) References Cited

U.S. PATENT DOCUMENTS 1,778,350 A * 10/1930 Bosco ...................... E04G 7/08
                                                             248/354.1
2,328,167 A * 8/1943 Ratigan ................... F16G 11/04
                                                             24/136 R
(Continued)

FOREIGN PATENT DOCUMENTS

| JP | 11-350728 | 12/1999 |
| JP | 2001-304210 | 10/2001 |
| JP | 2009-264072 | 11/2009 |

OTHER PUBLICATIONS

International Search Report for PCT/US2014/023974, dated Jul. 21, 2014, 3 pp.
(Continued)

*Primary Examiner* — James Ference
(74) *Attorney, Agent, or Firm* — Brinks Gilson & Lione

(57) ABSTRACT

A clamp and universal wedge clamp system is provided. The system includes a rigid clamp that is formed to define first and second arms that extend from opposite ends of a central member. The first and second arms each comprise a finger that extends inwardly toward the finger extending inwardly from the opposite arm, and at least one of the first and second arms comprising a slot defined through the arm along a portion of a length of the arm. A wedge extends through the slot, wherein the clamp and the wedge are collectively configured to removably retain a beam upon either one of a substantially cylindrical shoring post, or a substantially rectangular shoring post.

19 Claims, 7 Drawing Sheets

(51) Int. Cl.
*E04G 5/16* (2006.01)
*E04G 7/26* (2006.01)

(56) References Cited

U.S. PATENT DOCUMENTS

| | | | | |
|---|---|---|---|---|
| 2,743,657 A * | 5/1956 | Kriegbaum | ............ | A01B 35/22 172/763 |
| 3,179,212 A * | 4/1965 | Gostling | ............ | E04G 7/301 182/178.5 |
| 3,350,750 A * | 11/1967 | Scarr | ............ | F16G 11/14 403/157 |
| 3,385,556 A * | 5/1968 | Pauli, Jr. | ............ | E04G 17/001 249/194 |
| 3,420,557 A * | 1/1969 | Francis | ............ | E04G 1/15 182/186.8 |
| 4,015,399 A * | 4/1977 | Prins | ............ | E04B 1/24 52/285.4 |
| 4,044,523 A * | 8/1977 | Layher | ............ | E04G 7/307 182/186.8 |
| 4,083,640 A * | 4/1978 | Lovering | ............ | E04G 7/307 182/186.8 |
| 4,348,128 A * | 9/1982 | Gostling | ............ | E04G 7/307 403/189 |
| 4,405,254 A * | 9/1983 | Tooley | ............ | E04G 7/307 182/186.8 |
| 4,430,019 A * | 2/1984 | D'Alessio | ............ | E04G 7/26 182/178.1 |
| 4,493,578 A * | 1/1985 | D'Alessio | ............ | E04G 7/307 182/186.8 |
| 4,522,527 A * | 6/1985 | Grandpierre | ............ | E04G 7/307 182/186.8 |
| 4,525,096 A * | 6/1985 | Green | ............ | E04G 7/307 182/186.8 |
| 4,530,616 A * | 7/1985 | Roux | ............ | E04G 7/307 403/246 |
| 4,566,819 A * | 1/1986 | Johnston | ............ | E04G 7/14 403/385 |
| 4,587,786 A * | 5/1986 | Woods | ............ | E04G 7/307 182/186.8 |
| 4,619,541 A * | 10/1986 | Lovering | ............ | E04G 7/307 182/186.8 |
| 4,840,513 A * | 6/1989 | Hackett | ............ | E04G 7/307 182/186.8 |
| 4,867,274 A * | 9/1989 | Langer | ............ | E04G 7/307 182/186.8 |
| 4,958,702 A * | 9/1990 | Langer | ............ | E04G 7/307 182/186.8 |
| 4,976,566 A * | 12/1990 | Yeomans | ............ | A01B 15/00 172/751 |
| 5,024,037 A * | 6/1991 | Ono | ............ | E04G 7/307 403/174 |
| 5,127,757 A * | 7/1992 | Langer | ............ | E04G 7/307 182/186.8 |
| 5,207,527 A * | 5/1993 | Duncan | ............ | E04G 7/307 182/186.8 |
| 5,217,314 A * | 6/1993 | Perruelle | ............ | E04G 7/307 182/186.8 |
| 5,315,805 A * | 5/1994 | Harsch | ............ | E04B 2/744 403/170 |
| 5,411,113 A * | 5/1995 | Lubinski | ............ | E04G 7/22 182/186.7 |
| 5,649,404 A * | 7/1997 | Reinklou | ............ | E04G 21/3214 24/522 |
| 5,730,432 A * | 3/1998 | Gendreau | ............ | E04G 17/045 269/217 |
| 5,961,240 A * | 10/1999 | Bobrovniczky | ............ | E04G 7/307 182/186.8 |
| 6,179,511 B1 * | 1/2001 | Gassler | ............ | E04B 2/766 403/170 |
| 6,244,581 B1 * | 6/2001 | Arnhold | ............ | B25B 5/08 269/152 |
| 6,283,251 B1 * | 9/2001 | Merkel | ............ | E04G 5/16 182/179.1 |
| 6,322,277 B1 * | 11/2001 | Jennings | ............ | E04G 7/307 403/174 |
| 7,530,540 B2 * | 5/2009 | Long | ............ | E04B 2/744 248/219.1 |
| 8,048,127 B2 * | 11/2011 | Moulin | ............ | A61B 17/6466 606/278 |
| 8,303,207 B2 * | 11/2012 | Thacker | ............ | E04G 7/307 182/186.8 |
| 2006/0206182 A1 * | 9/2006 | Pyles | ............ | A61N 1/0551 607/117 |
| 2006/0208152 A1 | 9/2006 | McCracken | | |
| 2012/0039686 A1 * | 2/2012 | Miller | ............ | B22D 41/00 411/355 |
| 2012/0186910 A1 | 7/2012 | Thacker et al. | | |

OTHER PUBLICATIONS

International Search Report and Written Opinion for PCT/US2014/023974, dated Jul. 21, 2014, 11 pages.
International Preliminary Report on Patentability and Written Opinion for PCT/US2014/023974, dated Sep. 15, 2015, 9 pp.
Office Communication for CA 2,905,908, with Examination Search Report dated Aug. 3, 2016, 4 pp.

* cited by examiner

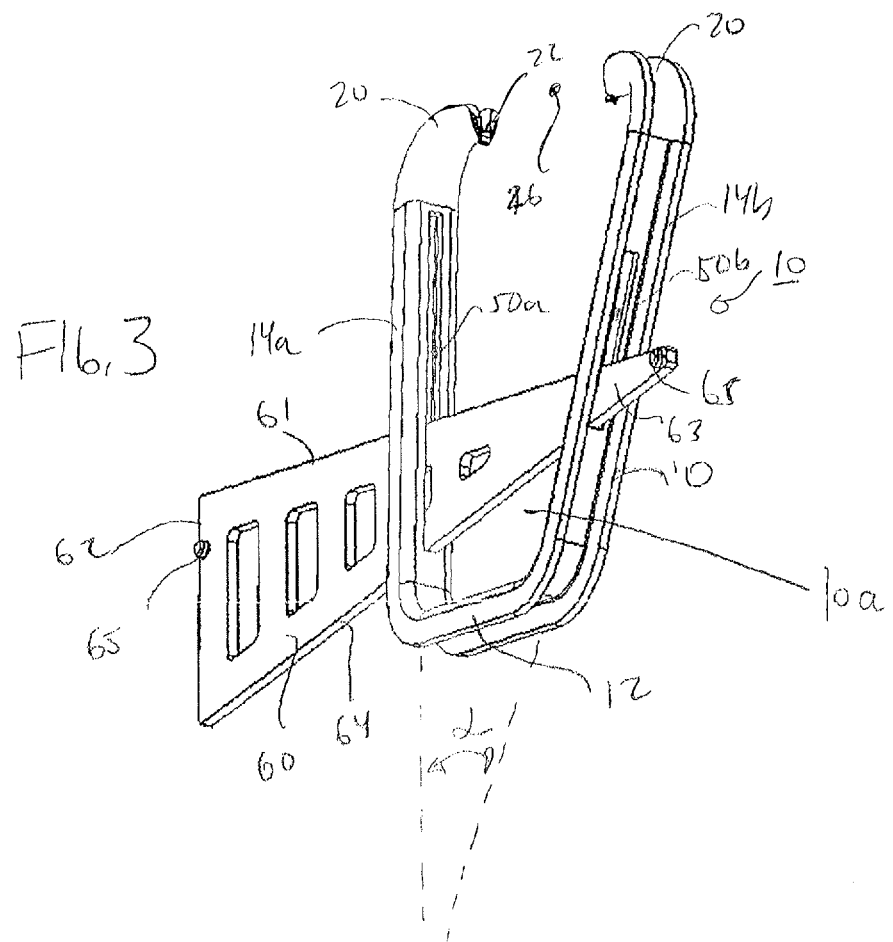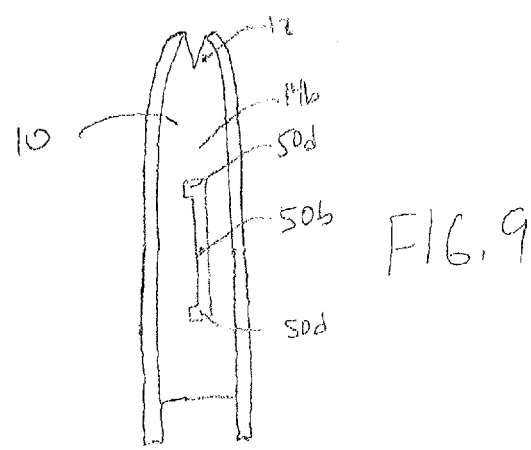

UNIVERSAL WEDGE CLAMP

CROSS-REFERENCE TO RELATED APPLICATIONS

This application claims priority from U.S. Provisional Application No. 61/781,412, filed on Mar. 14, 2013, the entirety of which is hereby fully incorporated by reference herein.

TECHNICAL FIELD

This disclosure relates to a shoring apparatus used in forming concrete structures and, more specifically to a clamp useful in interconnecting components of scaffolding or bearing structures for shoring posts. Concrete forming apparatus is in wide use in the construction of buildings, bridges, and other concrete structures. The formwork against which the concrete is formed is often held in place by shores and the like. In creating a shoring apparatus having the desired strength, it is common to interconnect vertical components of a shoring apparatus. Because of the variety of the size and shape of concrete structures formed using the shoring apparatus, it is advantageous to have the ability to interconnect various components of the showing apparatus, such as a beam, in a wide variety of configurations.

BRIEF SUMMARY

In one form, the disclosure is directed to a clamp configured to engage a shoring post. The shoring post may be circular or non-circular.

In one form, the disclosure is directed to a clamp having two arms, each arm having at least one finger that curves inwardly, which allows it to engage a shoring post.

In one form, the disclosure is directed to arms on a clamp, where the arms are at an acute angle to one another.

In one form, the disclosure is directed to a clamp that is configured to receive a wedge, wherein the wedge has a raised surface that prevents the wedge from coming out of engagement with the clamp.

In one form, the disclosure relates to a clamp used in a universal wedge clamp system, the universal wedge clamp system comprising a clamp, beam, wedge, and shoring pole. The universal wedge clamp system is configured to be arranged so that the beam is in a horizontal position relative to the ground surface. The universal wedge clamp system is also configured to be arranged so that the beam is in an angled position relative to the ground surface.

In yet another form, the disclosure provides a clamp. The claim includes first and second arms, each of the first and second arms having at least one finger extending at an angle from the respective arm whereby the finger is configured to engage a shoring post. A slot is defined in at least one of the first and second arms configured to receive a wedge therethrough.

In still another form, the disclosure provides a universal wedge clamp system. The system includes a rigid clamp formed to define first and second arms that extend from opposite ends of a central member. The first and second arms each comprise a finger that extends inwardly toward the finger extending inwardly from the opposite arm. At least one of the first and second arms comprises a slot defined through the arm along a portion of a length of the arm. A wedge extends through the slot, wherein the clamp and the wedge are collectively configured to removably retain a beam upon either one of a substantially cylindrical shoring post, or a substantially rectangular shoring post.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF THE DRAWINGS

FIG. 3 is a perspective view of the clamp and wedge of the universal wedge clamp of FIG. 1.

FIG. 9 is a side view of the clamp of the universal wedge clamp of FIG. 1 showing the slot disposed therethrough.

DETAILED DESCRIPTION OF THE DRAWINGS AND THE PRESENTLY PREFERRED EMBODIMENTS

Figure 1:
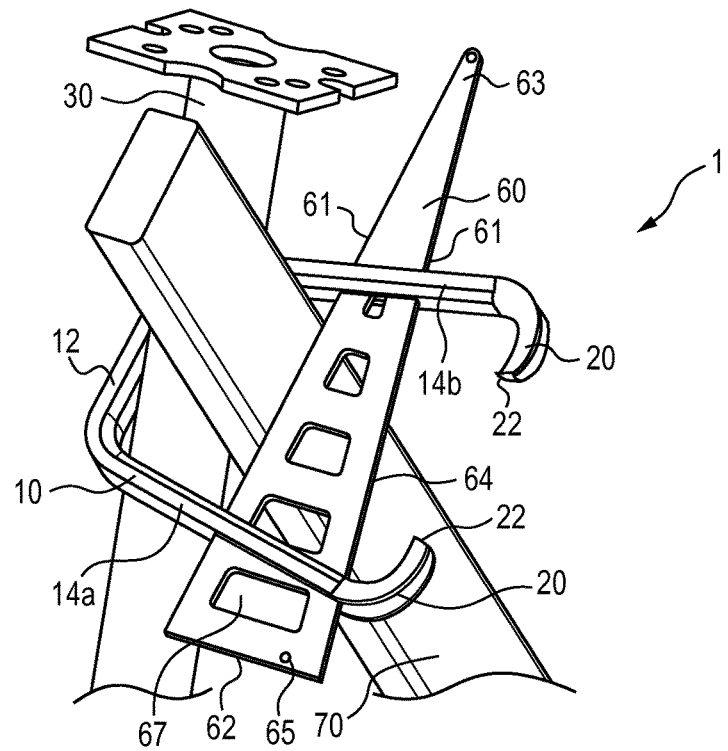
FIG. 1 is a perspective view of the universal wedge clamp supporting a beam upon a cylindrical shoring post.

Turning now to FIGS. 1-9, a universal wedge clamp system 1 is provided. The system 1 includes a clamp 10 used to hold bracing structures, such as elongate beams 70 onto shoring posts 30. The shoring posts may be telescoping posts with a fine adjustment connector that supports the inner and outer telescoping posts, and are conventional. The system 1 is configured to retain beams 70 upon either substantially cylindrical shoring posts 30 or upon rectangular shoring posts 130, or other geometries of shoring posts 130.

The clamp 10 is configured to be installed and removed from shoring posts 30 (FIG. 1-4), or 130 (FIGS. 5-7) and may be generally U-shaped. Clamp 10 may have three sides: a central side 12 and first and second arms 14a, 14b that may extend from opposite ends of the central side 12, with the clamp 10 formed from a single continuous member. At the extended end of each arm 14a, 14b (furthest away from central side 12) are fingers 20. One or both of the fingers 20, may include a curved portion, or tip 22, which extend inwardly (i.e. toward the flat side 12). The tips 22 of the fingers 20 may be configured to rest within a longitudinal recess 132 within a shoring pole 130.

Figure 6:
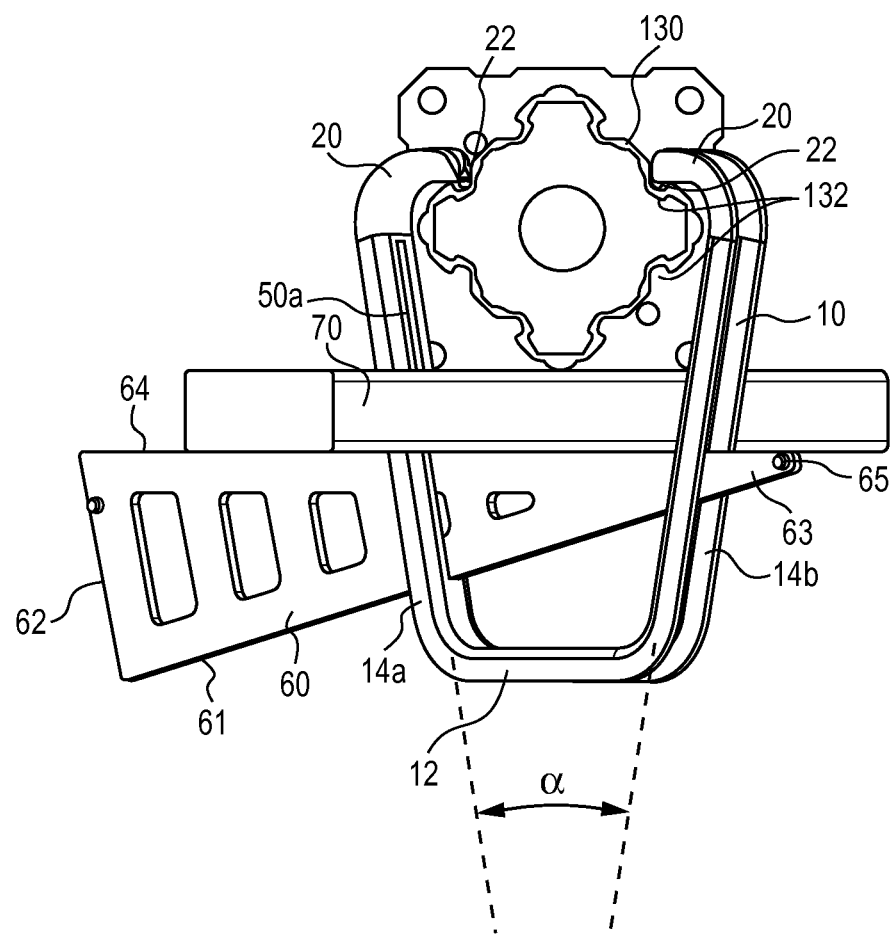
FIG. 6 is a top view of the configuration of FIG. 5.

In one form, the first and second arms 14a, 14b may each be substantially straight along their length and may be arranged at an acute angle α with respect to each other as they extend from the central portion 12 (as best shown in FIGS. 3 and 6). In some embodiments, the acute angle α may be at an angle within the range of about 15 degrees to about 30 degrees (inclusive of the angles within this range).

In other embodiments, the acute angle α may be within the range of between about 20-25 degrees (inclusive of the angles within this range). In some specific embodiments, the angle may be 20, 21, 22, 23, or 25 degrees, or another suitable angle. Those of ordinary skill in the art when referencing this disclosure will contemplate that the acute angle α that is appropriate will be a function of the relative size of the arms 14a, 14b as well as the spacing therebetween. In other embodiments, the first and second arms 14a, 14b may be curved along their length, or a portion of their length, and may be formed with portions that are at an acute angle with respect to each other, or with differing angles along their length. In other embodiments, the first and second arms 14a, 14b may be disposed substantially parallel to each other along all or a portion of their length.

In some embodiments, the clamp 10 and wedge 60 may be sized and shaped such that they can collectively (along with a shoring post 30/130) support a beam 70 in a perpendicular relationship to a vertical shoring post 30/130 (FIG. 8), or in other embodiments so that it can support a beam 70 within a range of acute angles with respect to a vertical shoring post 30/130 (FIGS. 4 and 7), to allow for supporting crossing beams 70.

As best shown in FIG. 3, one or both of the first and second arms 14a, 14b may include a slot 50a, 50b (respectively) that extends through a portion of the length of the arm respective arm 14a, 14b. The slots 50a, 50b are arranged to provide space for a wedge 60 to slide therethrough. In some embodiments for ease of manufacture (where the arms 14a, 14b are identical), the first and second slots 50a, 50b may also be of identical length and width. In other embodiments, the first arm 14a is such that the short leg 62 of the wedge 60 is outboard of the arm 14a, and the second arm 14b is configured such that the vertex 63 of the wedge is outboard of the second arm 14b. In this embodiment, the first slot 50a is a longer length than the second slot 50b, which will minimize the size of the opening within the second slot 50b when the wedge 60 is fully tightened within the second slot 50b. In embodiments where each arm 14a, 14b includes a slot 50a, 50b, the first and second slots 50a, 50b are preferably aligned such that a flat wedge 60 can extend simultaneously through both of the first and second slots 50a, 50b.

The wedge 60 may be generally wedge-like in shape. For example, in some embodiments, the wedge 60 may be shaped similar to a right triangle, normally with one base 61 proximate to the vertex 63 that is significantly longer than the opposite base 62. In some embodiments where the wedge 60 is a right triangle, the wedge 60 is disposed with respect to the clamp 10 such that the base 61 faces the central arm 12 and the hypotenuse 64 faces the opening between the opposed fingers 20 (although the wedge 60 may be disposed in the opposite configuration as well). In other embodiments, the wedge 60 may be an isosceles triangle, with the sides mutually contacting the vertex 63 with a significantly longer length than the base 62 opposite from the vertex 63.

The wedge 60 may be made of any suitable material, such as metal (e.g. steel) or plastic. In some embodiments, steel is preferred due to the large compressive loads that the wedge 60 may carry as the wedge 60 is pinned between the slots 50a, 50b in the first and second arms 14a, 14b and the shoring pole 30, with the beam 70 therebetween. The wedge 60 is also normally made from a strong material to be able to carry the impact forces delivered thereto by a hammer directed upon the base 62 when tightening the wedge 60 within the clamp 10 (and the beam 70 between the post 30/130 and the wedge 60), as well as the impacts upon the vertex 63 when releasing the wedge from compressive contact with the beam 70 (between the post 30/130 and the wedge 60).

The wedge 60 may include one or more raised portions 65. The raised portions 65 may be disposed proximate the vertex 63 and may be disposed proximate the second base 62 (opposite from the vertex 63). The raised portions 65 are configured so that when the wedge 60 is engaged with the clamp 10, by extending the wedge through one or both of slots 50a, 50b disposed within the first and second arms 14a, 14b, the wedge 60 will be prevented from inadvertent withdrawal from the slots 50a, 50b. In some embodiments, the raised portions 65 may be a dimple formed in the material of the wedge, such that the combined thickness of the raised portion 65 and the wedge 60 is wider than the width of the respective first or second slot 50a, 50b that neighbors the raised portion. In other embodiments, the raised portion 65 may be a projection that is fixed to the wedge 60.

In other embodiments, and shown specifically in FIG. 9, the slot 50b on the second arm 14b may include one or two bumps 50d at one or both end portions of the slot 50b. The bumps 50d are configured to allow the raised portion 65 upon the vertex 63 of the wedge 60 to pass therethrough, which allows the wedge to be fully withdrawn from the second slot 50b. As will be appreciated with reference to FIGS. 1-4, in embodiments where the clamp 10 engages a post 30 with the post bearing against the central side 12 of the clamp 10 and the beam 70 (as urged by the wedge 60) on the opposite side, the wedge 60 must be withdrawn from the second slot 50b to allow the clamp 10 to surround the post 30. The first slot 50a (through the first arm 14a) is normally of a uniform width, less than the combined thickness of the wedge 60 and the raised portion 65 to prevent the wedge 60 from being disconnected from the clamp 10.

In some embodiments, the first and second arms 14a, 14b and the central portion 12 may be formed with the same cross-section along their length, such that the entire clamp 10 is initially formed from an elongate stock that is bent into the final configuration. In some embodiments, the clamp may include a flat profile, a round profile, or a C-shaped (FIG. 9), V-shaped, or L-shaped profile, either of which might provide acceptable strength and rigidity to the clamp 10, while minimizing the weight and the amount of material needed to form the clamp 10.

The clamp 10 is configured to receive a beam 70 (such as a 2×4 or another elongate beam of another profile) through an internal volume 10a of the clamp 10. As mentioned above, the combination of the clamp 10 and the wedge 60 provide for compression of a beam 70 between a side surface of the wedge 60 (either the base 61 or the hypotenuse 64) and the shoring post 30/130. The compression of the beam 70 may be activated by urging the wedge 60 further into the clamp 10, normally by impacts upon the base 62 by a hammer or mallet. The compressive forces upon the beam 70 from the post 30/130 and the side of the wedge 60 establishes a significant normal force upon the opposite surfaces of the beam (contacting the post 30/130 and the wedge 60, respectively) which establishes a large frictional force therebetween to prevent sliding between the post 30, the beam 70, and the wedge 60.

Figure 5:
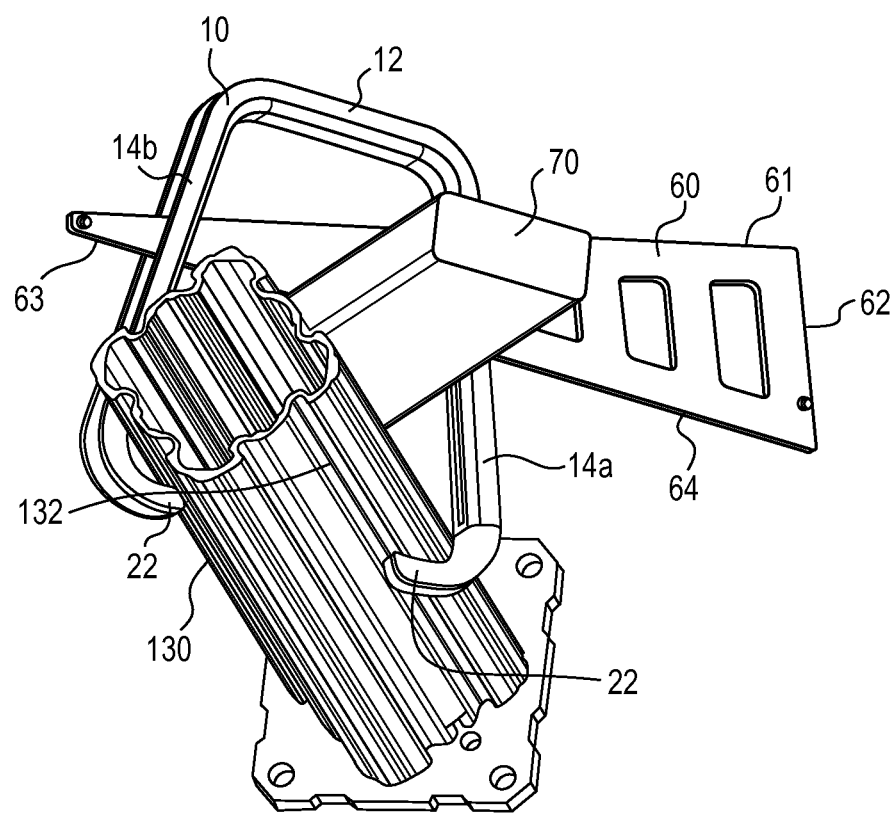
FIG. 5 is the universal wedge clamp of FIG. 1 supporting a rectangular shoring post.
Figure 7:
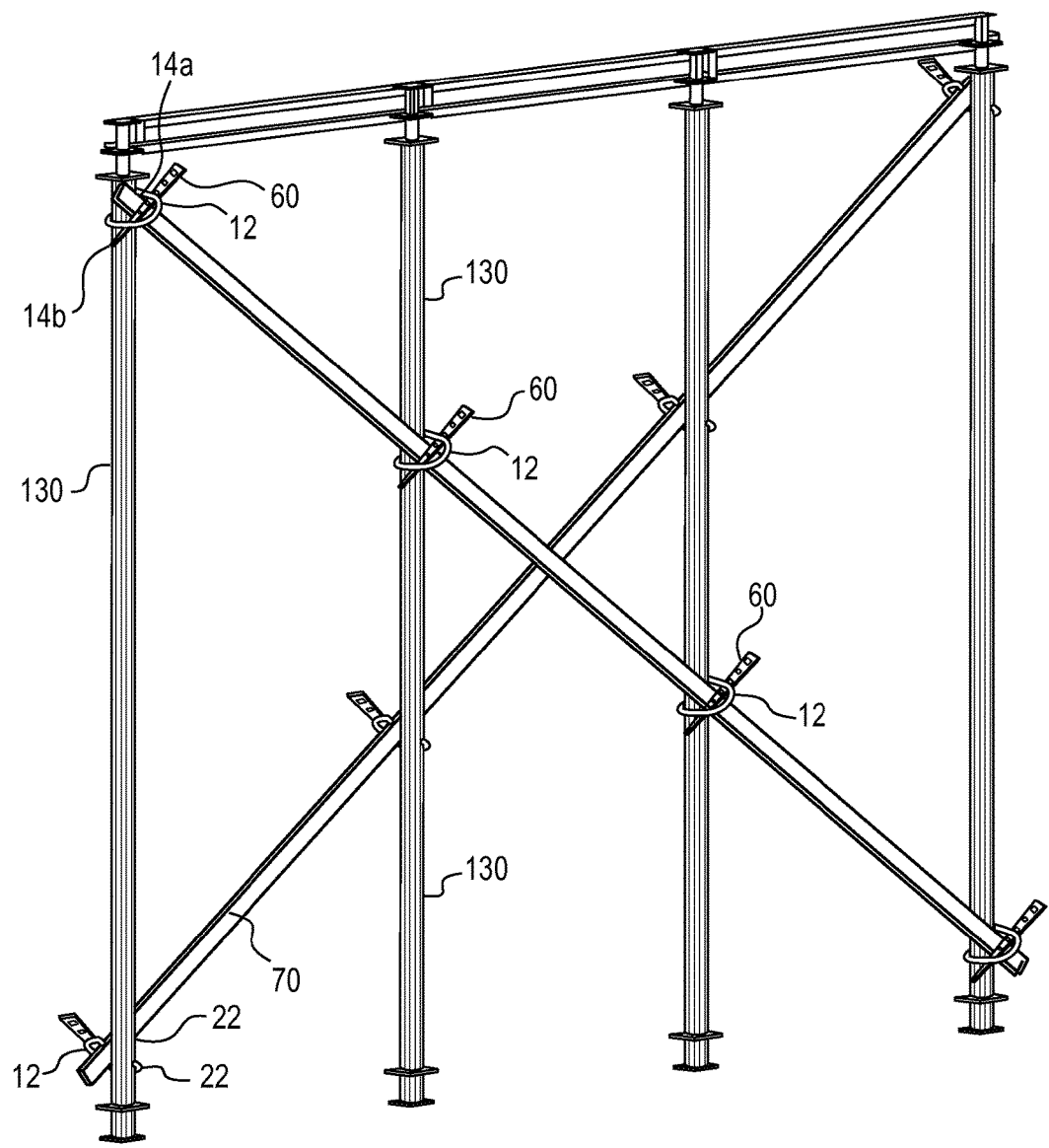
FIG. 7 is a side view a plurality of vertical rectangular shoring posts supporting crossing beams with a plurality of universal wedge clamps of FIG. 1.
Figure 8:
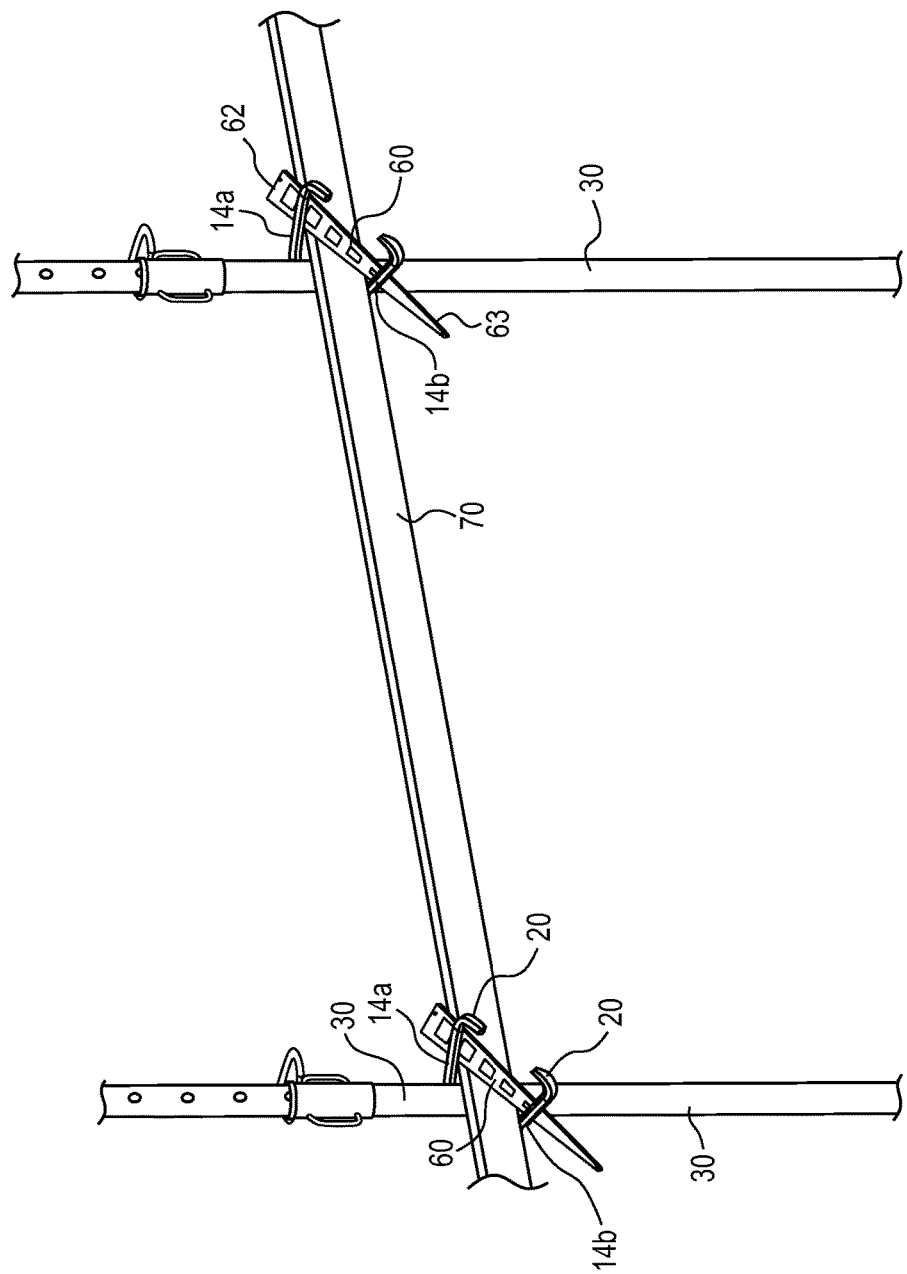
FIG. 8 is a side view of two vertical shoring posts supporting a horizontal beam with two universal wedge clamps of FIG. 1.

As shown in FIGS. 5-7, the clamp 10 may be disposed upon an shoring post 130, such as a rectangular or square post, that includes a plurality of indentations or recesses 132 along the length thereof, with the fingers 20 and specifically the tips 22 upon the ends of the fingers 20 engaging recesses upon the post 130 to prevent slipping between the clamp 10 and the post 130. The opening 26 (FIG. 3) between the opposite fingers 20 allows for the clamp 10 to engage the shoring post 130 after the post 130 is set up at the construction site, and the bracing beams 70 may be disposed upon a plurality of neighboring posts 130 (FIG. 7) with a plurality of clamps 10. The placement of the fingers 20 and the tips 22 are preferably positioned to fit within recesses 132 on neighboring faces of the shoring post 130, which may be perpendicular to each other. In some embodiments, the placement and size of the fingers 20 and tips are such that the tips 22 engage or fit within recesses that are disposed either in an outer post 130a of a set of telescoping shoring posts, or in the inner post 130b of the telescoping posts 130.

It has been found that certain dimensions of the clamp aid in working with a plurality of different types of shoring posts 130, and in particular rectangular posts, with a plurality of elongate recesses 132. For example, the opening 26 between the opposing fingers 20 of about 115 to about 120 mm has been found to be a suitable size, with the tips 22 extending about 2 or 3 mm inward from the inner surface of the finger 20 has been found to suitably engage the recesses 132 within typical shoring posts 130.

Figure 2:
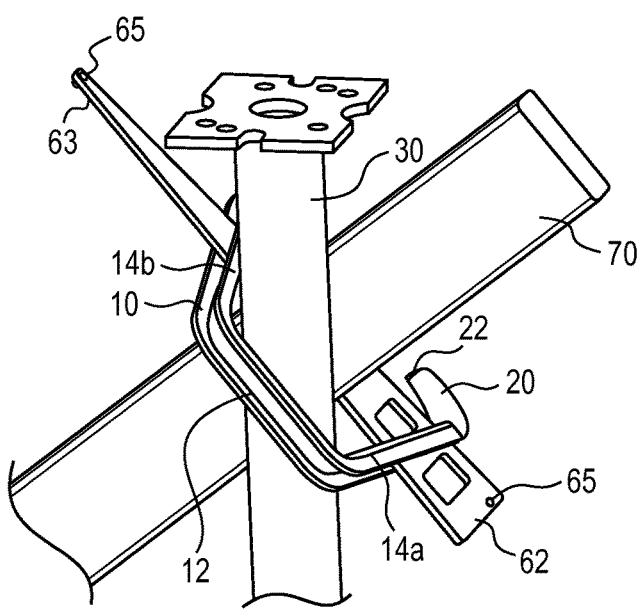
FIG. 2 is the arrangement of FIG. 1 shown from an opposite perspective view.
Figure 4:
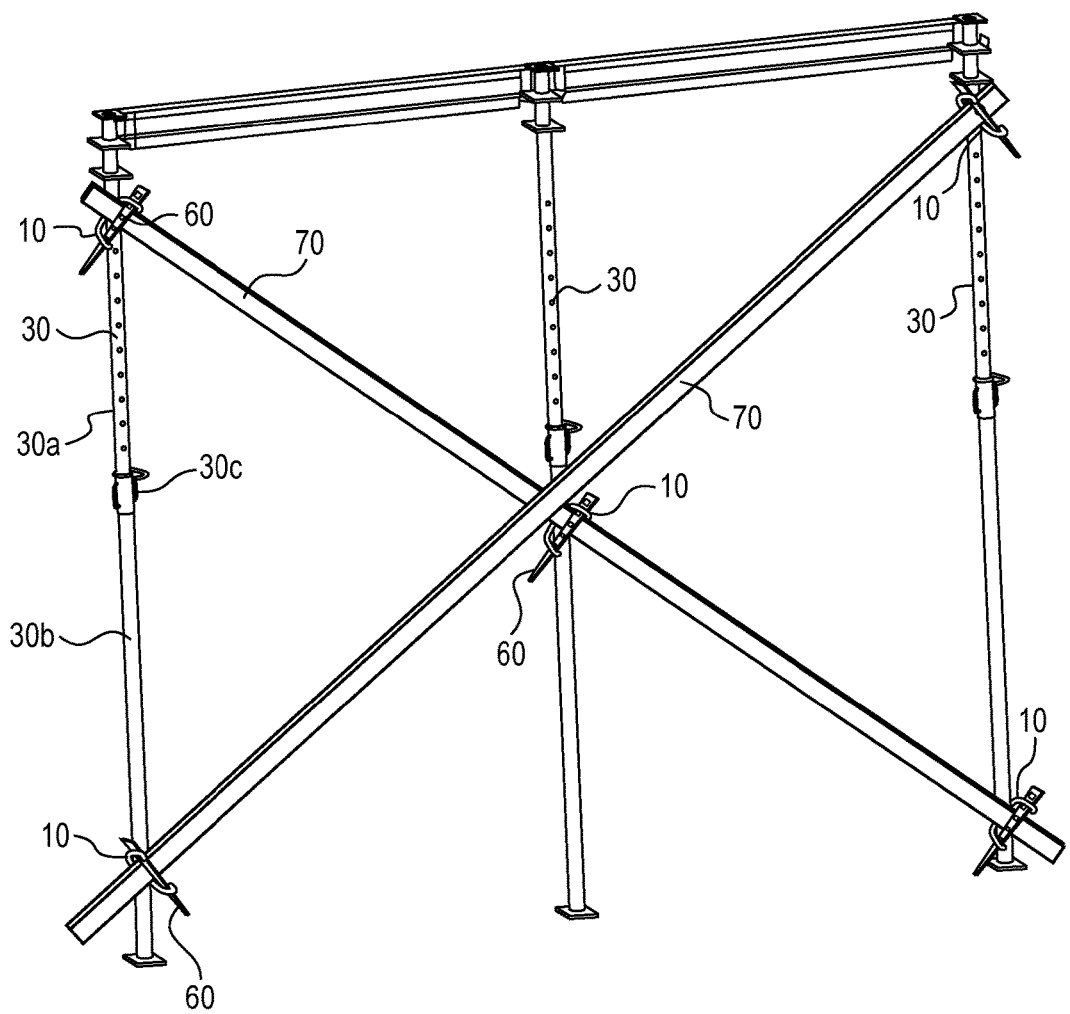
FIG. 4 is a side view of a plurality of vertical shoring posts supporting crossing beams with a plurality of universal wedge clamps of FIG. 1.

As shown in FIGS. 1, 2, and 4, the clamp 10 and wedge 60 are equally applicable to support a beam 70 that is fixed to a round shoring post 30. In this orientation, the clamp 10 is disposed upon the post 30 such that the post contacts the central portion 12 of the clamp 10 and the opposite side of the post 30 contacts the beam 70, which is held in compression between the post 30 and the wedge 60.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The invention claimed is:

1. A clamp comprising:
   first and second arms, the first arm having a first finger extending at an angle from the first arm and the second arm having a second finger extending at an angle from the second arm, wherein the first and second arms and the first and second fingers are formed from a single continuous member,
   whereby the first finger comprises a first inward extending portion that extends inwardly towards the second finger and the second finger comprises a second inward extending portion that extends inwardly toward the first finger, whereby the first and second inward extending portions run parallel with each other, whereby a first tip extends from a bottom surface of the first inward extending portion and a second tip extends from a bottom surface of the second inward extending portion,
   whereby the first and second tips are configured to engage a shoring post;
   a slot defined in the first arm configured to receive a wedge therethrough; and
   an inner volume configured to receive a beam therethrough,
   wherein a side surface of the wedge and the shoring post are configured to compressively receive the beam therebetween.

2. The clamp of claim 1, wherein the first and second arms extend at an acute angle with respect to each other.

3. The clamp of claim 1, wherein the shoring post is a non-circular shoring pole.

4. The clamp of claim 3, wherein the non-circular shoring pole comprises a plurality of elongate recesses, wherein the first tip and the second tip are configured to engage the plurality of elongate recesses.

5. The clamp of claim 1, wherein the shoring post is circular.

6. The clamp of claim 5, wherein the clamp further comprises a central portion disposed between the first and second arms, wherein the shoring post is configured to be compressively received between the central portion and the wedge.

7. The clamp of claim 1, wherein the clamp is configured to compressively hold the beam in a perpendicular arrangement to the shoring post positioned in a vertical configuration.

8. The clamp of claim 1, wherein the second arm comprises a slot defined therethrough and wherein the slot on the first arm has a greater length than the slot on the second arm.

9. The clamp of claim 1, wherein the clamp is formed from the single continuous member.

10. The clamp of claim 1, wherein the first and second tips extend toward a central portion disposed between the first arm and the second arm.

11. The clamp of claim 1, wherein the clamp is configured to compressively hold the beam within a range of acute angles with respect to the shoring post positioned in a vertical configuration.

12. A universal wedge clamp system, comprising:
    a clamp formed from a single continuous member to define first and second arms that extend from opposite ends of a central member, the first arm comprising a first finger and the second arm comprising a second finger, whereby the first finger comprises a first inward extending portion that extends inwardly towards the second finger and the second finger comprises a second inward extending portion that extends inwardly toward the first finger, whereby a first tip extends from a bottom surface of the first inward extending portion and a second tip extends from a bottom surface of the second inward extending portion, whereby the first and second tips extend toward the central member, and at least the first arm comprises a slot defined through the arm along a portion of a length of the arm, and
    a wedge that extends through the slot, wherein the clamp and the wedge are collectively configured to removably retain a beam upon either one of a substantially cylindrical shoring post, or a substantially rectangular shoring post, wherein the beam is received through an inner volume of the clamp between a side surface of the wedge and the shoring post.

13. The universal wedge clamp system of claim 12, wherein the first and second arms extend from the central member at an acute angle with respect to each other.

14. The universal wedge clamp of claim 12, wherein the clamp and wedge are collectively configured to support a beam in a horizontal manner upon a substantially vertical shoring post.

15. The universal wedge clamp system of claim 12, wherein the clamp is formed from a single continuous member.

16. The universal wedge clamp system of claim 12, wherein the second arm comprises a slot defined therethrough and wherein the slot on the first arm has a greater length than the slot on the second arm.

17. The clamp of claim 12, wherein the substantially rectangular shoring pole comprises a plurality of elongate recesses, wherein the first tip and the second tip are configured to engage the plurality of elongate recesses.

18. A clamp comprising:
first and second arms and a central portion, the first arm having a first finger extending at an angle from the first arm and the second arm having a second finger extending at an angle from the second arm, wherein the central portion, the first arm and first finger, and the second arm and the second finger are formed from a single continuous member,
wherein the first arm extends from a first end of the central portion and the second arm extends from an opposite second end of the central portion, wherein the first arm, second arm, and the central portion extend through a single plane, wherein the first and second arms extend from the central portion to define an inner volume between the first and second arms and the first and second fingers, wherein the inner volume is configured to receive a beam therethrough,
whereby the first finger comprises a first inward extending portion that extends inwardly towards the second finger and the second finger comprises a second inward extending portion that extends inwardly toward the first finger, whereby a first tip extends from a bottom surface of the first inward extending portion and a second tip extends from a bottom surface of the second inward extending portion, wherein the first and second tips extend toward the central portion,
a slot defined in the first arm configured to receive a wedge therethrough; and
wherein a side surface of the wedge and the shoring post are configured to compressively receive the beam therebetween, whereby the first and second tips are configured to engage the shoring post and press the shoring post towards the side surface of the wedge.

19. The clamp of claim 18, wherein the first and second arms are spaced apart from each other by a first width, the first and second fingers extend toward each other and are spaced apart from each other by a second width, wherein the second width is narrower than the first width.

* * * * *